United States Patent [19]

Kia

[11] Patent Number: 5,225,135
[45] Date of Patent: Jul. 6, 1993

[54] BALANCED PRESSURE COMPRESSION MOLDING METHOD

[75] Inventor: Hamid G. Kia, Shelby Township, Macomb County, Mich.

[73] Assignee: General Motors Corporation, Detroit, Mich.

[21] Appl. No.: 752,803

[22] Filed: Aug. 30, 1991

[51] Int. Cl.$^5$ .............................................. B29C 43/14
[52] U.S. Cl. ................... 264/255; 264/257; 156/62.2; 425/444
[58] Field of Search ............... 264/250, 255, 257, 258, 264/313; 425/436, 436 M, 438, 444, 416, 422; 156/62.2

[56] References Cited

U.S. PATENT DOCUMENTS

| | | | |
|---|---|---|---|
| 4,009,978 | 3/1977 | Hanning | 425/444 |
| 4,353,857 | 10/1982 | Ray et al. | 264/258 |
| 4,636,422 | 1/1987 | Harris et al. | 264/258 |
| 4,867,670 | 9/1989 | Munk | 425/422 |
| 4,929,170 | 5/1990 | Boskovic | 425/436 R |
| 4,937,032 | 6/1990 | Krone et al. | 156/62.2 |
| 5,089,206 | 2/1992 | Kia | 156/62.2 |

FOREIGN PATENT DOCUMENTS

| | | | |
|---|---|---|---|
| 61-43542 | 3/1986 | Japan | 264/258 |
| 785046 | 12/1980 | U.S.S.R. | 425/422 |

*Primary Examiner*—Jay H. Woo
*Assistant Examiner*—Duane S. Smith
*Attorney, Agent, or Firm*—Randy W. Tung

[57] ABSTRACT

A balanced pressure compression molding method in which a first charge of a plastic material that will at least constitute the reinforcing means, i.e., the ribs and/or bosses, is first placed in the mold and compressed, the mold is then opened and a second charge of the plastic material is placed in the mold to constitute the flat or panel portion of the panel part after compression. A force is applied to the ejector means of the molding apparatus such that a pressure between 500 to 1500 psi is generated inside the rib sections. This force is removed before the end of the molding cycle. A plastic part having a perfect appearance surface without sink mark defects can be produced.

5 Claims, 1 Drawing Sheet

BALANCED PRESSURE COMPRESSION MOLDING METHOD

FIELD OF THE INVENTION

The present invention generally relates to a method of molding glass fiber reinforced plastic panels and more specifically, relates to a method of producing glass fiber reinforced plastic panels with integral ribs and bosses without the sink mark defects.

BACKGROUND OF THE INVENTION

Glass fiber reinforced plastics exhibit superior physical and mechanical properties over unreinforced plastics. As a result, they are widely used in the automotive industry to produce a wide variety of interior and exterior parts. One of the most frequently used glass fiber reinforced plastic systems is sheet molding compound (SMC). SMC is a material composed of reinforcing chopped glass fibers combined with a complex resin system formulated in an almost infinite number of ways. A typical formulation includes ingredients such as inorganic fillers, thickeners, curing agents, and internal mold release agent in addition to a carrier polyester resin and a shrinkage-control agent.

The flexibility in SMC formulation lends itself to a variety of end use properties for molded parts which are suitable for a wide spectrum of commercial applications. One major application is in the automotive industry for producing exterior body panels. For many years, SMC parts have been used in exterior body parts such as hoods, deck lids, and door panels. The application of SMC materials in automotive exterior body parts is sometimes limited by appearance problems caused by inadequate processing and product design. Some of these commonly observed appearance problems are sink marks over ribs and bosses, waviness of the surface, and surface porosity. Some of these problems have been solved by either making a modification in the formulation or by adding an extra step in the processing of SMC parts. For instance, the use of a low profile agent, or shrinkage control agent, have been found to greatly improve the surface waviness on molded SMC panels. The process of molded coating by injecting a thin layer of specially formulated coating into an SMC mold immediately after the completion of the SMC cure cycle is a technique found to be effective in producing a surface free from porosity.

Although the utilization of the molded coating and the shrinkage control agent has reduced the extent of sink marks, traces of sink marks still exist on SMC panels having integral ribs and bosses. One way of solving this problem is to style and design surface contours such that the small traces of sink marks are concealed. However, for large flat horizontal panels such as automobile hoods and deck lids which require numerous ribs to achieve the required stiffness, sink marks cannot always be concealed with design lines. As a result, in order to avoid sink marks in the manufacturing of many large horizontal parts, a design of two piece panels bonded together are frequently used. In a bonded two piece panel design, a flat panel having a perfect appearance surface is bonded by adhesives to a support panel having ribs for stiffness and bosses for mounting hardware. This is a very costly design in that not only two separate pieces of panels need to be molded in separate processes, but also one additional bonding step must be used to bond the two panels together. It is therefore more desirable to design a one piece panel having reinforcing means such as ribs and bosses on the back and a perfect appearance surface in the front that can be processed in one molding step.

It is, therefore, an object of the present invention to provide a method of producing chopped glass fiber reinforced plastic panels having integral ribs and bosses and an appearance surface without sink mark defects.

It is another object of the present invention to provide a method of producing glass fiber reinforced plastic panels having integral ribs and bosses and an appearance surface without sink marks defects by balancing the molding pressure in the ribs and bosses with the molding pressure in the flat panel portion.

SUMMARY OF THE INVENTION

I discovered that one of the causes of sink marks on the appearance side of plastic panels having integral reinforcing means such as ribs and bosses is the separation of resins and fibers as well as the misalignment of the fibers in the vicinity of the ribs and bosses. The solution to the problem of sink marks is, therefore, the elimination of this resin and fibers heterogeneity. This can be achieved by a new dual charge compression molding method in which a first charge of a plastic material that will at least constitute the reinforcing means, i.e., the ribs and/or bosses, is first placed in the mold and compressed, the mold is then opened and a second charge of the plastic material is placed in the mold to constitute the flat or panel portion of the part after compression.

Two important processing criteria should be fulfilled in the dual charge compression molding method. First, the first charge of plastic material must be in a quantity sufficient enough to fill all the ribs and bosses portion of the mold cavity such that all the ribs and bosses are completely filled after the first compression. In practice, I have noted that an indication of such complete fill is that a thin web of the plastic material is formed in-between and connecting all the ribs and bosses. The second important criterion of the process is that the time of compression on the first charge of plastic material must be sufficiently short and the mold must be opened prior to the time that the first charge of plastic material is completely cured. This is important because there must be some residual unreacted monomers and oligomers left in the first charge after the compression that will chemically react with the second charge of plastic material to form a strong bond. In the event that the first charge is completely cured, a weak bond formed between the first charge and the second charge could result in a weak panel.

Even with the dual compression molding technique, sometimes the sink marks defect cannot be completely avoided. I have discovered another parameter that contributes to the formation of sink marks, i.e., the molding pressure inside the rib sections during the compression molding process. My discovery shows that as the SMC resin inside the rib sections is polymerized, a chemical shrinkage occurs which causes the molding pressure inside the rib sections to decrease. This loss of molding pressure inside the rib sections leads to the formation of sink marks.

I have discovered that the degree of the molding pressure drop inside the rib sections varies with rib location and charge geometry, as well as the kinetics of the curing process In a typical compression molding process, the molding pressure in the flat panel (skin) portion is approximately 1000 psi. I have found that the molding pressure inside the rib sections, depending on the location, can vary between 20 to 1000 psi. I have, therefore, devised a technique to maintain the molding pressure inside the rib sections at levels approximately equivalent to that of the SMC material in the flat panel (skin) portion of the part. By using this technique, an SMC panel reinforced with ribs and bosses can be compression molded with a substantially flat surface without the sink marks defect.

BRIEF DESCRIPTION OF THE DRAWINGS

Other objects, features and advantages of the present invention will become apparent upon consideration of the specification and the appended drawings in which.

DETAILED DESCRIPTION OF THE PREFERRED EMBODIMENT

In accordance with a preferred practice of my invention, a method of producing glass fiber reinforced plastic panels having a perfect appearance surface without any sink mark defect can be carried out by the following operative steps.

First, a set of two matching mold members are provided of which one of the two opposing interior mold surfaces has cavities for ribs and bosses. The lower mold member having the rib cavity is then heated to 150° C. and treated with a mold release material. Approximately 1000 grams of an SMC material is placed in the mold and compressed to flow. The formulation for my polyester resin based SMC material is shown in Table I.

TABLE I

| Chemical Composition of SMC | |
|---|---|
| COMPONENT | WEIGHT % |
| Polyester resin (STYPOL ® 40-3941) | 16.9 |
| Low profile additive (NEULON ® A)) | 13.0 |
| Styrene Monomer | 2.6 |
| Filler ($CaCo_3$) | 65.0 |
| Thickener ($Mg(OH)_2$) | 1.5 |
| Mold Release (zinc stearate) | 0.7 |
| Initiator (t-butyl perbenzoate) | 0.3 |

The polyester used in this formulation (STYPOL ®40-3941) is a product of Freeman Chemical Company. The low profile additive is a product of Union Carbide. The magnesium hydroxide was predispersed in a polyester carrier resin to 40% weight ratio by the manufacturer (Plasticolors Inc.), and designated as PLASTIGEL ®9037. The Styrene monomer used was grade AR and produced by Baker Chemical. The resin was compounded with 27% by weight 1 inch chopped glass fibers produced by Owens Corning Fiberglass. The external mold release used in these experiments was FREKOTE ® produced by HYSOL Corporation. It is a silicone blend in a mixture of tri-chloro-difluoro-methane. The low profile additive used, NEULON ®A, is a polyvinyl acetate of 40% solid in styrene monomer.

Figure 1:
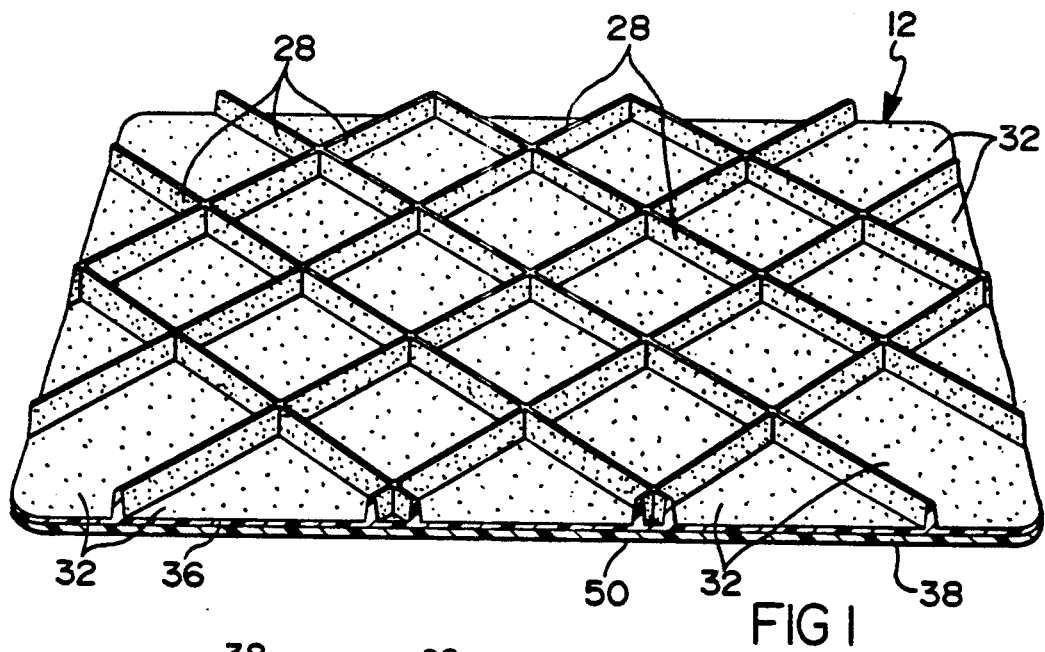
FIG. 1 is a perspective view of the rib side of a plastic panel having reinforcing ribs.

FIG. 1 is a perspective view of the rib side 32 of a plastic panel 12 having integral reinforcing ribs 28.

After the mold is closed for 10 to 20 seconds, the mold is opened to expose a partially cured polyester resin paste that is easily released from the upper mold member. I have found that in order to have good adhesion between the two layers, i.e., between the first charge and the second charge of SMC material, the first charge should preferably have a short mold closing time such that the first charge plastic material is not completely cured before it comes in contact with the second charge of plastic material.

After the compression of the first charge plastic material 36, the rib portion 30 of the cavity is completely filled after compression between the upper mold member 20 and the lower mold member 10. The complete filling of rib portion 30 is normally indicated by the formation of a web section in-between and connecting rib 28 with other ribs (not shown). The compression pressure used in making the first charge plastic material flow and filling the rib portion 30 of the cavity is at least sufficient to flow the plastic material. I have found that depending upon the viscosity of the resin paste, a pressure in the range between 250 to 1500 psi is sufficient.

Figure 2:
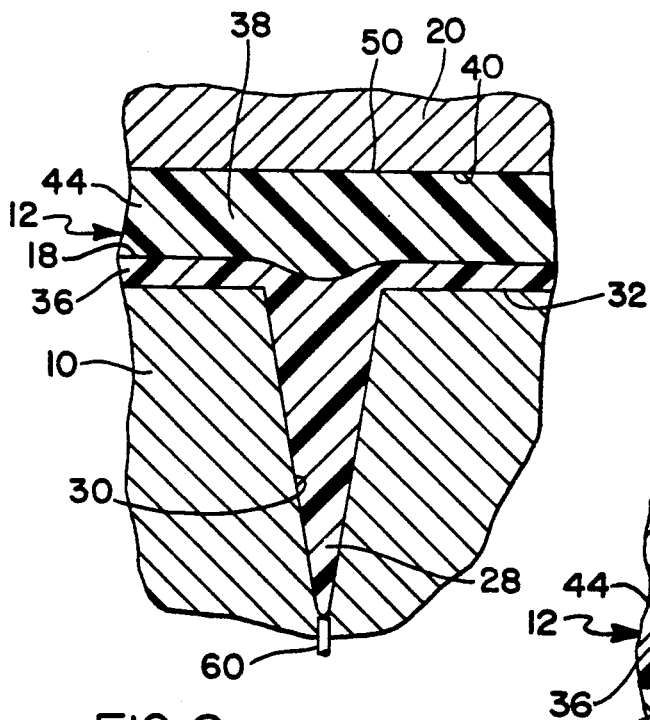
FIG. 2 is an enlarged cross-sectional view of a rib section of a dual charge compression molded SMC panel showing the ejecting pin arrangement.
Figure 3:
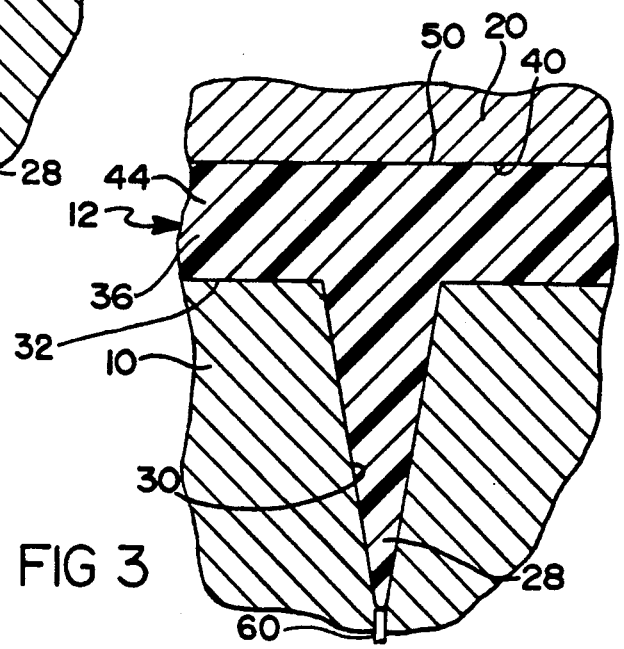
FIG. 3 is an enlarged cross-sectional view of a rib section of a single charge compression molded SMC panel showing the ejecting pin arrangement.

After the first charge is partially cured and the mold is opened, the second charge of approximately 1000 grams is placed in the mold on top of the first charge at interface 18 and the upper mold member is again closed onto the lower mold member to compress and form the plastic panel. This is shown in FIG. 2. Plastic panel 12 is completely formed after the second charge of plastic material 38 is compressed between upper mold 20 and lower mold 10 to fill the panel portion of the cavity 44 and forming an appearance surface 50 by the upper mold surface 40. The second charge of plastic material is cured for approximately 10 to 30 seconds before the ejector pins 60 are activated while the mold is still closed. The timing is important for the proper application of the pressure. The ejector pins should be activated after the solidification of the material at the bottom of the rib sections and before the solidification of the material in the flat panel (skin) portion opposite the rib sections. The hydraulic pressure applied on the ejector pins is calculated as follows.

Since it is difficult to exactly match the rib section and the flat panel section pressures, a workable range was defined. Using a flat plaque mold, it was observed that molding at pressures in the range of 500 psi to 1500 psi does not affect the quality of the surface. Therefore, it was decided to control the pressure inside the rib sections within plus or minus 500 psi of the pressure of the skin. To achieve this goal holding pressure was applied on the rib sections independent of the compression mechanism of the molding press. A modified version of ejector pins were used to apply this pressure. A normal ejection system includes ejector pins and return pins. The return pins also act as a safety measure against the possibility of the cavity surface hitting the ejector pins on any accidental closure of the mold prior to retraction of the ejector pins. Furthermore, the return pins do not allow the movement of the ejector pins when the mold is in a closed position for the same reason.

For the purposes of this invention, the ejector pins were placed only at the bottom of the rib sections, and there were none for the flat panel areas. The return pins were also modified to allow for the movement of the pins without having to open the mold. This way it was possible to use the ejector pins when the mold was closed. As a result, it was practical to use the ejector pins as a means of secondary source of pressure during the molding operation. The imposed pressure was calculated using the following relationship.

$$P_2 = \frac{P_1 A_1}{A_2}$$

Where
  $P_1$ is the molding pressure on the flat panel (skin) portion,
  $A_1$ is the total area of rib sections at base,
  $P_2$ is the hydraulic pressure for the pins, and
  $A_2$ is the total cross-sectional area of the pins.

Knowing the total cross sections of the pins, the rib sections and the molding pressure, the hydraulic pressure on the pins can be calculated and monitored. The following examples show how this technique was used.

I have discovered that a suitable mold closing time for the first charge plastic material is between 10–100 seconds depending on the thickness of the first charge and the temperature of the upper mold member. I have also discovered that in order to form a satisfactory bond between the first charge and the second charge plastic materials, it is desirable to have approximately 1–5 percent of the active ingredients remaining active on the surface of the first charge plastic material such that the active ingredients will chemically bond the molecules to the active molecules on the surface of the second charge plastic material. The degree of cure on the surface of the first charge plastic material can be determined by using established chemical analysis techniques such as the differential thermal analysis.

In an alternate method of single charge compression molding, a mold with integrated ribs (one flat side and one ribbed side) is heated to 150° C. and treated with mold release. About 2000 grams of SMC charge is placed in the mold and compressed to flow. In about 20 to 40 seconds after the completion of the flow, the ejector pins are activated while the mold is still closed. Again, the timing is important for a proper transfer of pressure. The ejector pins should be activated after the solidification of the material at the bottom of the rib sections and before solidification of the material in the flat panel portions opposite the ribs. The hydraulic pressure of the pins as calculated from the previous equation was maintained within 2500 to 7500 psi to create an effective pressure within the rib sections in the range of 500 to 1500 psi. After 30 to 60 seconds the ejector pins are deactivated, the mold is opened, and the ejector pins are activated again to eject the part.

Other types of glass fiber reinforced plastic materials such as glass fiber reinforced thermoplastics or other non-polyester based thermosets may work equally well in my novel balanced pressure compression molding technique.

While my invention has been described in terms of a preferred embodiment and an alternate embodiment thereof, it is to be appreciated that those skilled in the art will readily apply these teachings to other possible variations of the invention.

The embodiments of the invention in which an exclusive property or privilege is claimed are defined as follows:.

1. A compression molding method for making glass fiber reinforced plastic parts having a first surface being an appearance surface and a second surface containing integral reinforcing means comprising the steps of:
  providing a set of matched mold members each having an interior mold surface defining a mold cavity having a reinforcing portion and a flat panel portion contained therein when the two mold members are closed together,
  providing an ejecting means for acting on said reinforcing portion for the ejection of said plastic part from said mold cavity,
  loading a quantity of glass fiber filled plastic material into said mold cavity sufficient to fill substantially the mold cavity,
  compressing said mold members together under a pressure sufficient to partially cure said reinforcing portion of said plastic part,
  applying force to said ejecting means such that a pressure between 500 and 1500 psi occurs inside said reinforcing portion of said plastic part for a time period between 30 to 60 seconds before said part is fully cured,
  removing said force to said ejecting means, and
  opening said mold members and demold said molded plastic part.

2. In the method defined by claim 1, said loading step further include loading a first charge of plastic material into said mold cavity sufficient to fill substantially the reinforcing portion of said mold cavity, compressing said mold members together under a sufficient pressure, opening said mold members before said first charge of plastic material is fully cured, and loading a second charge of plastic material on top of said first charge of plastic material sufficient to fill said panel portion of said mold cavity.

3. In the method of claim 1, said reinforcing means further comprising reinforcing ribs.

4. In the method of claim 1, said reinforcing means further comprising reinforcing bosses.

5. In the method of claim 1, said reinforcing means further comprising reinforcing ribs and bosses.

* * * * *